US007493399B2

(12) United States Patent  (10) Patent No.: US 7,493,399 B2
Ogura  (45) Date of Patent: Feb. 17, 2009

(54) DATA TRANSFER SYSTEM AND DATA TRANSFER METHOD

(75) Inventor: Daisuke Ogura, Tokyo (JP)

(73) Assignee: NEC Corporation, Tokyo (JP)

( * ) Notice: Subject to any disclaimer, the term of this patent is extended or adjusted under 35 U.S.C. 154(b) by 836 days.

(21) Appl. No.: 11/122,183

(22) Filed: May 4, 2005

(65) Prior Publication Data

US 2006/0033746 A1  Feb. 16, 2006

(30) Foreign Application Priority Data

May 6, 2004   (JP)  .............................. 2004-137409
Mar. 16, 2005 (JP)  .............................. 2005-074507

(51) Int. Cl.
*G06F 15/16* (2006.01)
*H07Q 7/20* (2006.01)
*H07Q 7/00* (2006.01)

(52) U.S. Cl. ...................... 709/227; 455/436; 370/328
(58) Field of Classification Search ................ 709/202, 709/203, 227, 228; 455/436; 370/328
See application file for complete search history.

(56) References Cited

U.S. PATENT DOCUMENTS

| 6,519,461 | B1* | 2/2003 | Andersson et al. ........ 455/453 |
| 6,760,303 | B1* | 7/2004 | Brouwer .................... 370/229 |
| 6,807,419 | B1* | 10/2004 | Laiho et al. ................ 455/436 |
| 6,829,482 | B2* | 12/2004 | Rune et al. ................. 455/442 |
| 6,850,759 | B2* | 2/2005 | Van Lieshout et al. ... 455/426.1 |
| 6,879,832 | B1* | 4/2005 | Palm et al. ................. 455/445 |
| 6,889,050 | B1* | 5/2005 | Willars et al. ............ 455/452.2 |
| 6,895,245 | B2* | 5/2005 | Wallentin ................. 455/436 |
| 6,909,887 | B2* | 6/2005 | Fauconnier et al. ....... 455/403 |
| 7,164,917 | B2* | 1/2007 | Sakata et al. ............. 455/445 |
| 2005/0235190 | A1* | 10/2005 | Miyazaki et al. .......... 714/748 |
| 2006/0056333 | A1* | 3/2006 | Ogura ....................... 370/328 |
| 2006/0223533 | A1* | 10/2006 | Sakata ...................... 455/436 |

FOREIGN PATENT DOCUMENTS

EP  1 435 741 A2  7/2004
EP  1 571 862 A1  9/2005

* cited by examiner

*Primary Examiner*—Ario Etienne
*Assistant Examiner*—Sargon N Nano
(74) *Attorney, Agent, or Firm*—Scully, Scott, Murphy, Presser P.C.

(57) ABSTRACT

A data transfer system and its method, in which a plurality of U-plane controllers are connected to one C-plane controller and the number of the U-plane controllers is increased or decreased to realize a network structure of a low cost and to meet various conditions and requirements. Each U-plane controller sends at lease one of network traffic conditions, resource using conditions within itself and trouble conditions to the C-plane controller. The C-plane controller selects an optimum U-plane link for providing a user terminal with services and requests a core network to carry out a U-plane link exchange via an optimum U-plane controller. The core network carries out the U-plane link exchange.

8 Claims, 5 Drawing Sheets

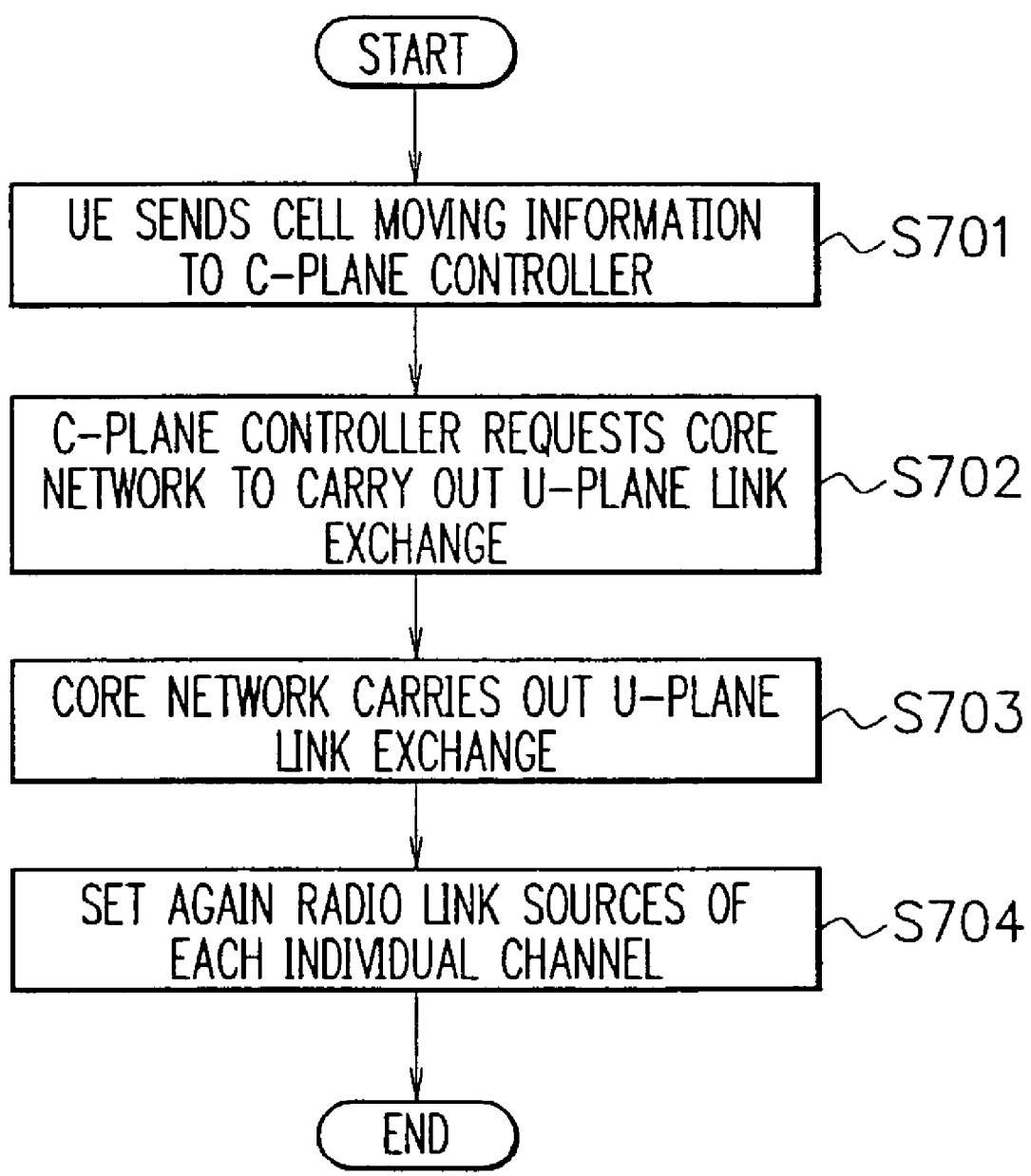

DATA TRANSFER SYSTEM AND DATA TRANSFER METHOD

BACKGROUND OF THE INVENTION

1. Field of the Invention

The present invention relates to a data transfer system and a data transfer method, in which a C-plane controller and a U-plane controller are separated from each other and the C-plane controller selects an optimum transmission line.

2. Description of the Prior Art

AUTRAN (Universal Terrestrial Radio Access Network) is a node which is positioned between a UE (User Equipment) or a user terminal such as a mobile phone or the like and a CN (Core Network) such as a switched network or the like and realizes an interconnection of their interfaces. An RNC (Radio Network Controller) accommodates a plurality of radio base stations via Iub interfaces for connecting the radio base stations to the RNC and carries out a variety of processing relating to control channels (CCHs) for communicating control information or data and traffic channels (TCHs) for transmitting user data. In this case, a common channel is commonly shared among users and an individual channel is assigned to each user.

In recent years, there has been spirited debate about all IP networking of the RNC as a controller of radio base stations in standardization of 3GPP (3rd Generation Partnership Projects). Since an increase of a using rate of a U-plane (user data plane) is expected in the future, it is necessary to consider the RNC in which a C-plane (control plane) and the U-plane are separated from each other. A new problem arises in the RNC realizing the all IP networking and the C-plane/U-plane separation. That it, the RNC is required not only to ensure operations realized in conventional systems but to control a plurality of U-plane controllers by one C-plane controller, which is considered in the C-plane/U-plane separation condition. For this new problem, an effective resource using system has not been made clear in the standardization of the 3GPP.

As mentioned above, the C-plane represents the control plane, that is, a link through which control message data passes between devices, and the U-plane the user data plane, that is, a link through which various contents data actually passes between the users.

Conventionally, a function for controlling a C-plane and a U-plane has been realized within one device and the links where the data has flowed have passed through the same route. The controllers for the C-plane and the U-plane are separated from each other in order to realize a network structure to meet various scalabilities. This concept is called separation of planes or the C-plane/U-plane separation.

Another technique has been proposed, as disclosed in Japanese Patent Laid-Open Publication No. 2004-48209. That is, when a U-plane controller for user data is congested in a wide band-code division multiple access communication system, a part of its processing is treated by another backup U-plane controller to maintain the processing. As a result, when an increase of the user data is expected, the processing of the user data within a network can be readily distributed to prevent the whole system from going down.

However, in this conventional system, problems still arise. That is, the radio base stations are necessarily in a one-to-one correspondence with the U-plane controllers, and if the load of the processing in a layer of the U-plane controllers can be distributed, one for realizing an optimum transmission line cannot be selected from a plurality of U-plane controllers depending on either an increase or a decrease of user data traffic within a service area.

SUMMARY OF THE INVENTION

It is therefore an object of the present invention to provide a data transfer system in view of the aforementioned problems of the prior art, where the present invention includes one C-plane controller and a plurality of U-plane controllers connected to the C-plane controller and hence is capable of changing the number of the U-plane controllers to realize a network structure of a low cost and to meet various conditions and requirements such as various scalabilities.

In accordance with one aspect of the present invention, there is provided a data transfer system comprising: a user terminal to be connected to radio base stations; a plurality of user data plane controllers connected to the radio base stations; a control plane controller connected to the user data plane controllers via a network; and a core network connected to the user data plane controllers via the network, each user data plane controller including a condition reporter for monitoring at least one of network traffic conditions, resource using conditions within itself and trouble conditions at a certain time and sending monitored condition information to the control plane controller, the control plane controller including: a condition information receiver for receiving the condition information from the condition reporter of the user data plane controller; a user data plane link selector for selecting an optimum user plane link for providing the user terminal with services on the basis of the condition information received by the condition information receiver; and a user data plane link exchange commander for requesting the core network to carry out a user data plane link exchange via an optimum user data plane controller, the core network including a user data plane link exchanger for carrying out the user data plane link exchange.

In a data transfer system, the condition reporter of the user data plane controller monitors at least one of the network traffic conditions, the resource using conditions within itself and the trouble conditions at a certain time and sends the monitored condition information to the control plane controller on the basis of a report request of the control plane controller.

In a data transfer system, the user terminal includes a cell moving communicator for sending cell moving information to the control plane controller when the user terminal in a CELL_PCH condition moves to another radio base station, and the control plane controller further includes a cell moving information receiver for receiving the cell moving information sent from the cell moving communicator of the user terminal. The user data plane link exchange commander checks that the radio base station of a moving target is assigned to which of the U-plane controllers on the basis of the cell moving information received by the cell moving information receiver and requests the core network to carry out the user data plane link exchange via the optimum user data plane controller.

In accordance with another aspect of the present invention, there is provided a data transfer method including a user terminal to be connected to radio base stations, a plurality of user data plane controllers connected to the radio base stations, a control plane controller connected to the user data plane controllers via a network, and a core network connected to the user data plane controllers via the network, comprising: step 1 for monitoring at least one of network traffic conditions, resource using conditions within itself and trouble conditions at a certain time and sending monitored condition information to the control plane controller by means of a condition reporter of each user data plane controller; step 2 for receiving the condition information from the condition reporter of the user data plane controller by means of a condition information receiver of the control plane controller; step 3 for selecting an optimum user plane link for providing the user terminal with services on the basis of the condition information received by the condition information receiver by means of a user data plane link selector of the control plane controller; step 4 for requesting the core network to carry out a user data plane link exchange via an optimum user data plane controller by means of a user data plane link exchange commander of the control plane controller; and step 5 for carrying out the user data plane link exchange by means of a user data plane link exchanger of the core network.

In a data transfer method, in step 1, the condition reporter of the user data plane controller monitors at least one of the network traffic conditions, the resource using conditions within itself and the trouble conditions at a certain time and sends the monitored condition information to the control plane controller on the basis of a report request of the control plane controller.

A data transfer method further comprises: step 6 for sending cell moving information to the control plane controller when the user terminal in a CELL_PCH condition moves to another radio base station by means of a cell moving communicator of the user terminal; and step 7 for receiving the cell moving information sent from the cell moving communicator of the user terminal by means of a cell moving information receiver of the control plane controller, and in step 4, the user data plane link exchange commander checks that the radio base station of a moving target is assigned to which of the U-plane controllers on the basis of the cell moving information received by the cell moving information receiver and requests the core network to carry out the user data plane link exchange via the optimum user data plane controller.

In a data transfer system and its method according to the present invention, a plurality of U-plane controllers are connected to one C-plane controller and a number of the U-plane controllers is increased or decreased to realize a network structure of a low cost and to meet various conditions and requirements.

BRIEF DESCRIPTION OF THE DRAWINGS

The objects, features and advantages of the present invention will become more apparent from the consideration of the following detailed description, taken in conjunction with the accompanying drawings, in which:

FIG. 7 is a flow chart showing a process for exchanging the U-plane links, as shown in FIG. 5.

DESCRIPTION OF THE PREFERRED EMBODIMENTS

Figure 1:
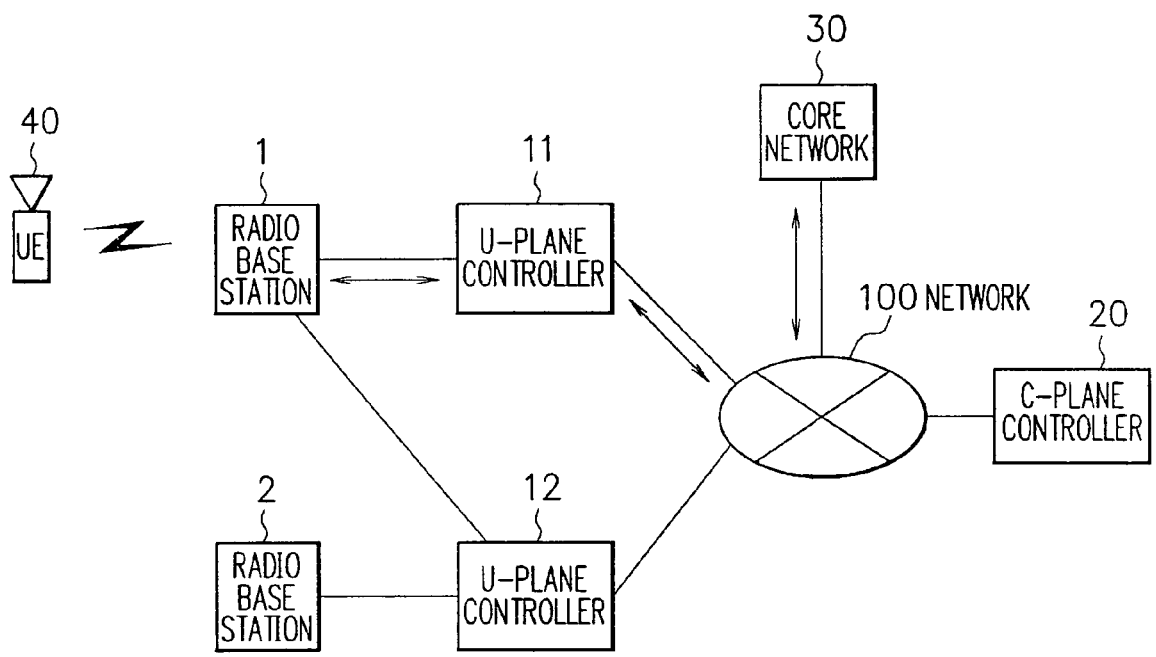
FIG. 1 is a block diagram of a data transfer system according to one embodiment of the present invention.

Referring now to the drawings, there is shown in FIG. 1 a data transfer system according to one embodiment of the present invention.

In FIG. 1, the data transfer system comprises two radio base stations 1 and 2, two U-plane controllers 11 and 12, the U-plane controller 11 connecting to the radio base station 1, the U-plane controller 12 connecting to the radio base stations 1 and 2, a C-plane controller 20, a core network 30 and a wireless UE (user equipment or terminal) 40.

The C-plane controller 20 and the core network 30 are each coupled with both the U-plane controllers 11 and 12 via a network 100.

The U-plane controllers 11 and 12 are assigned to the C-plane controller 20. The radio base station 1 belongs to the U-plane controller 11 and the radio base station 2 to the U-plane controller 12.

As shown in FIG. 1, the UE 40 is now in a PS (Packet Service) call communication condition using the radio base station 1 and the U-plane controller 11 and a U-plane link carries out communication such as sending and receiving with the UE 40 via the U-plane controller 11 and the radio base station 1.

Figure 2:
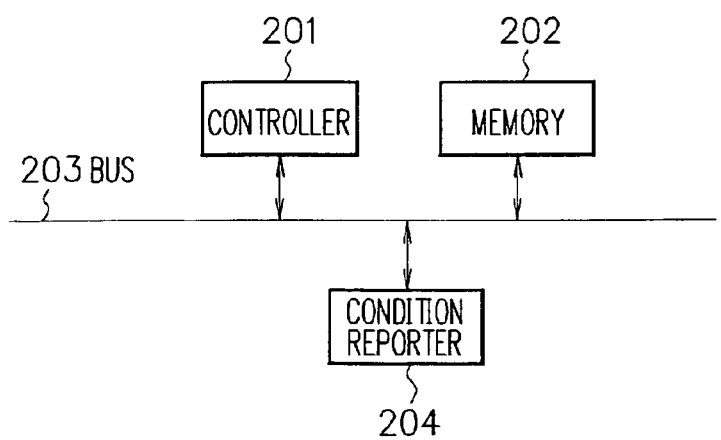
FIG. 2 is a block diagram of one embodiment of a U-plane controller shown in FIG. 1.

In FIG. 2, there is shown one embodiment of the U-plane controller 11 or 12 shown in FIG. 1, which includes a memory 202 for storing programs, data and the like, a condition reporter 204 for monitoring at least one of network traffic conditions, resource using conditions within the U-plane controller, trouble conditions and the like and reporting the monitored conditions to the C-plane controller 20 that the U-plane controller is assigned, a controller 201 for controlling the memory 202 and the condition reporter 204, and a bus 203 on which the controller 201, the memory 202 and the condition reporter 204 are placed.

Figure 3:
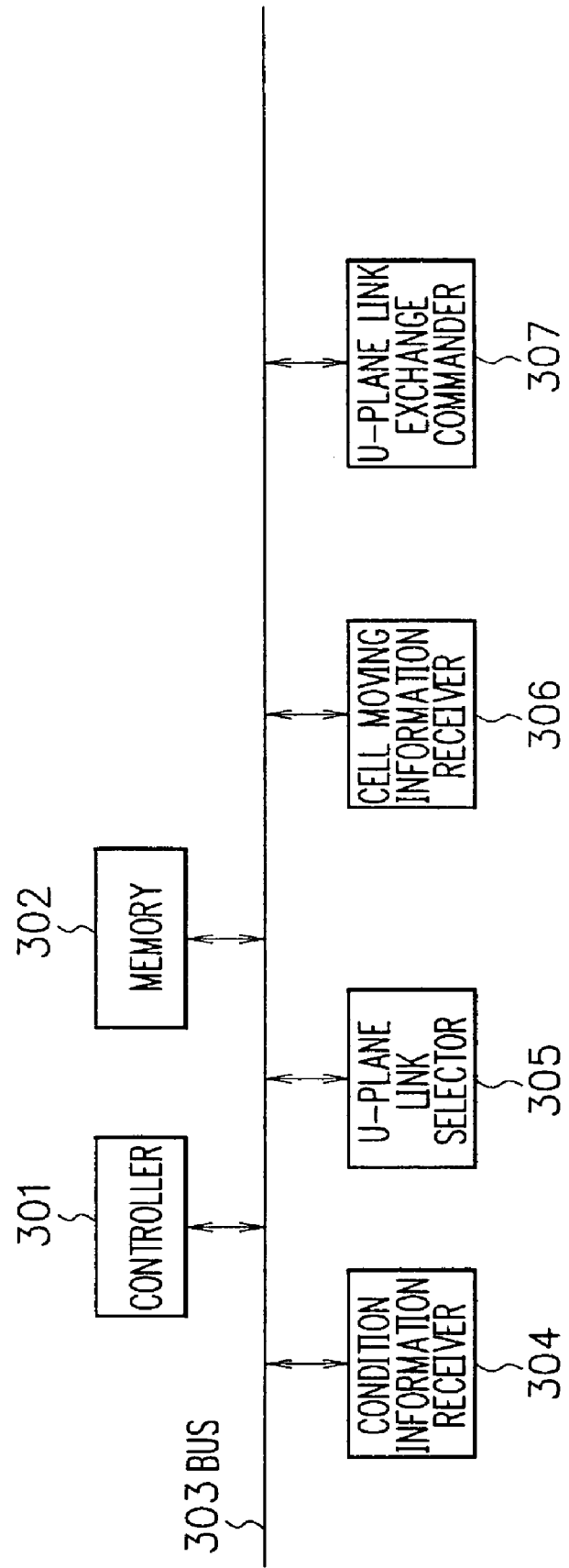
FIG. 3 is a block diagram of one embodiment of a C-plane controller shown in FIG. 1.

In FIG. 3, there is shown one embodiment of the C-plane controller 20 shown in FIG. 1, which includes a memory 302 for storing programs, data and the like, a condition information receiver 304 for receiving condition reports from each U-plane controller 11 or 12, a U-plane link selector 305 for selecting an optimum U-plane link, a cell moving information receiver 306 for receiving cell moving information from the UE 40, a U-plane link exchange commander 307 for requesting a U-plane link exchange of the U-plane controller 11 or 12, a controller 301 for controlling the memory 302, the condition information receiver 304, the U-plane link selector 305, the cell moving information receiver 306 and the U-plane link exchange commander 307, and a bus 303 on which the controller 301, the memory 302, the conditional information receiving 304, the U-plane link selector 305, the cell moving information receiver 306 and the U-plane link exchange commander 307 are placed.

Now, an operation of a U-plane link exchange in a data transfer system according to one embodiment of the present invention will now be described in detail with reference to FIG. 1 and FIGS. 4 to 7.

Figure 6:
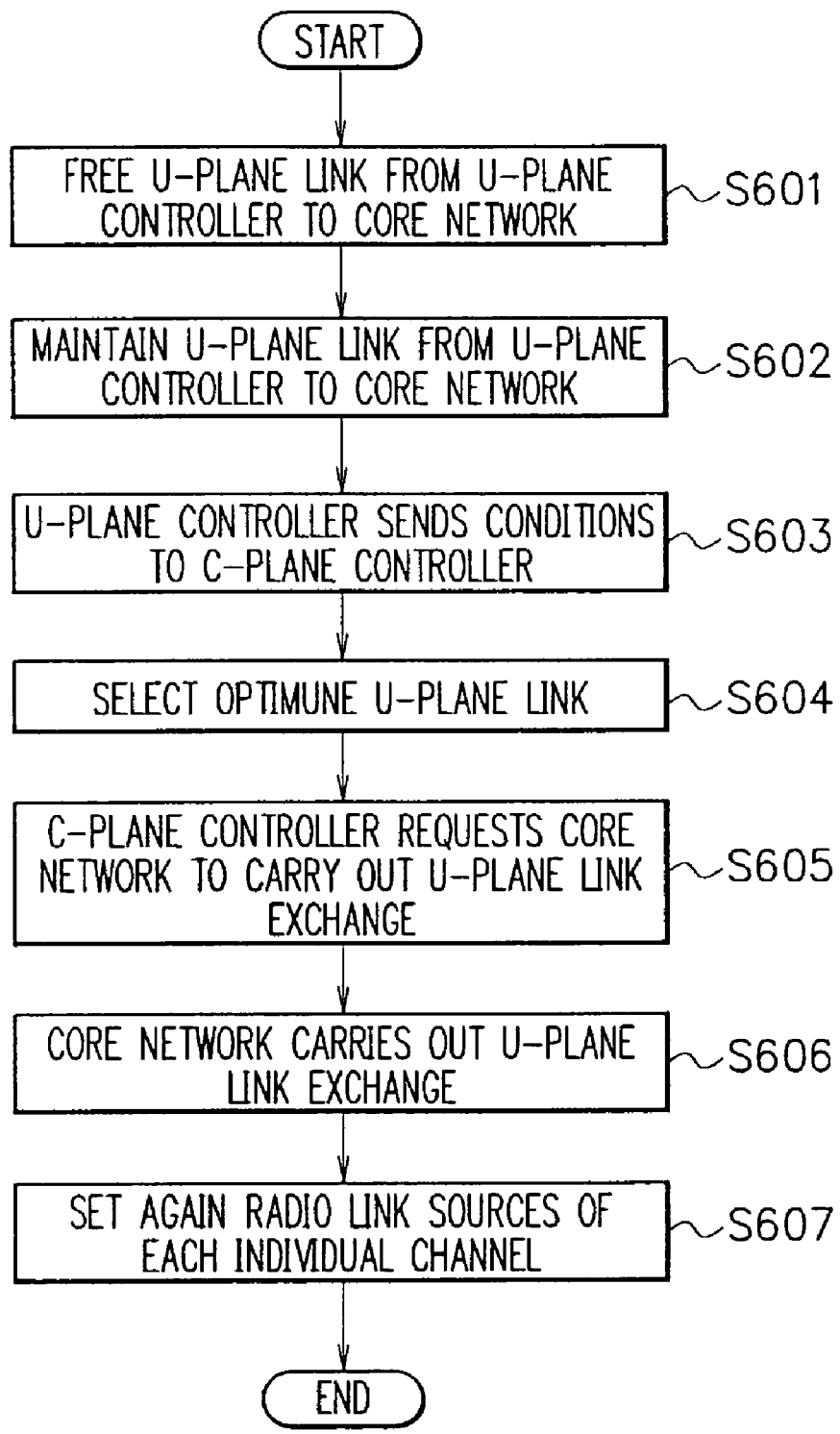
FIG. 6 is a flow chart showing a process for exchanging the U-plane links, as shown in FIG. 1 and FIG. 4.

First, as shown in FIG. 1 and FIG. 6, according to the conventions of the 3RPP standardization, when no packet data is communicated in a certain period of the PS call communication, a user terminal is allowed to change from a CELL_DCH condition to a CELL_PCH condition in order to perform an effective using of radio resources and to save a sending power of the user terminal. In the CELL_PCH condition, the U-plane link from the UE 40 to the radio base station 1 and from the radio base station 1 to the U-plane controller 11 is freed (step S601). The U-plane link is an individual channel resource over radio communication.

In this embodiment, the CELL_DCH condition represents a condition that a user terminal is communicating and in this condition the U-plane link is stretched or connected. The CELL_PCH condition represents a condition that the user terminal awaits only paging and in this condition the U-plane link is not stretched or disconnected.

In this way, in the CELL_PCH condition the user terminal is temporarily inactivated, seeing from a network side, to secure useless resources and to save the radio resources.

As described above, when no connection of the U-plane is made in a certain period after the user started a communication, the user terminal is allowed to change from the CELL_DCH condition to the CELL_PCH condition to achieve the effective using of the resources.

Relating to the U-plane link from the U-plane controller 11 to the core network 30 via the network 100, since the RNC side cannot know when down packet data is sent to the RNC side, the U-plane link is maintained for the U-plane controller 11 used at the moment when the UE 40 is changed from the CELL_DCH condition to the CELL_PCH condition in step S602.

Figure 4:
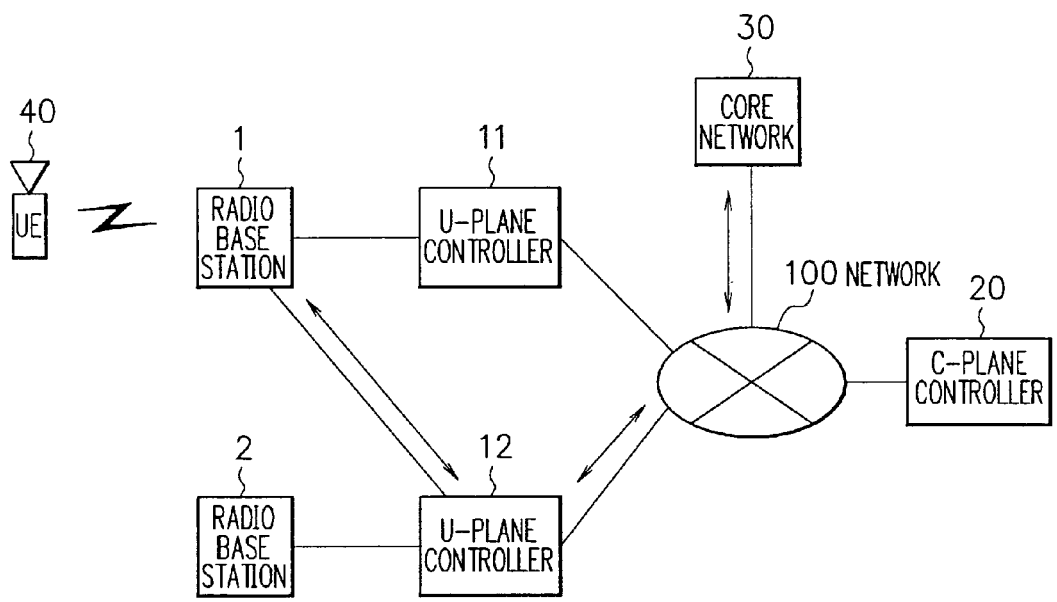
FIG. 4 is a block diagram of the data transfer system shown in FIG. 1, in which U-plane links are exchanged.

In FIG. 4, there is shown one embodiment of a U-plane link exchange between the radio base station 1 and the core network 30 via the U-plane controller 11 or 12, that is, from the U-plane controller 11, as shown in FIG. 1, to the U-plane controller 12 in a network-side-leading way, although the UE 40 in the CELL_PCH condition still belongs to the radio base station 1 after the UE 40 shown in FIG. 1 is changed from the CELL_DCH condition to the CELL_PCH condition.

In FIG. 4 and FIG. 6, the condition reporter 204 of U-plane controller 11 or 12 monitors network traffic conditions, resource using conditions within the U-plane controller, trouble conditions and the like at the present time and periodically reports the monitored results to the C-plane controller 20 to which the condition reporter 204 is assigned (step S603). In this case, the condition reports from the condition reporter 204 may be carried out at a timing based on report requests from the C-plane controller 20.

In the C-plane controller 20, the U-plane link selector 305 selects the optimum U-plane link for providing services for the UE 40 on the basis of the condition reports that the conditional information receiver 304 receives from each U-plane controller (step S604).

When the C-plane controller 20 determines that the present U-plane link between the radio base station 1 and the core network 30 via the U-plane controller 11 is optimum, where that U-plane link has been used just before the UE 40 is changed from the CELL_DCH condition to the CELL_PCH condition, the C-plane controller 20 does not send any request to the core network 30. On the other hand, when the C-plane controller 20 determines that the U-plane link between the radio base station 1 and the core network 30 via the U-plane controller 12 is optimum, the U-plane link exchange commander 307 makes a U-plane link exchange request to the core network 30 for carrying out a U-plane link exchange from the U-plane controller 11 to the U-plane controller 12 by using a newly defined message (step S605).

In this case, "the newly defined message" means a new message used for requesting the core network 30 to flow data to a different U-plane controller depending on the traffic conditions of the U-plane controllers 11 and 12 while the C-plane controller 20 controls the traffic conditions of the U-plane controllers 11 and 12. Since the C-plane/U-plane separation is not considered in the conventional system, the message is newly defined in the present system.

When receiving the U-plane link exchange request from the C-plane controller 20, the core network 30 exchanges the U-plane link by changing from the U-plane controller 11 to the U-plane controller 12 (step S606). Further, in this embodiment, when the U-plane links are exchanged, since negotiation of call connection information has finished in the core network side, which is the RNC side, a new C-plane setting from the U-plane controller 12 to the core network 30 is not needed and only the U-plane link change in the sending direction of the packet data is carried out.

When up or down packet data is produced, radio link resources of each individual channel are set again via the U-plane controller 12 (step S607).

Figure 5:
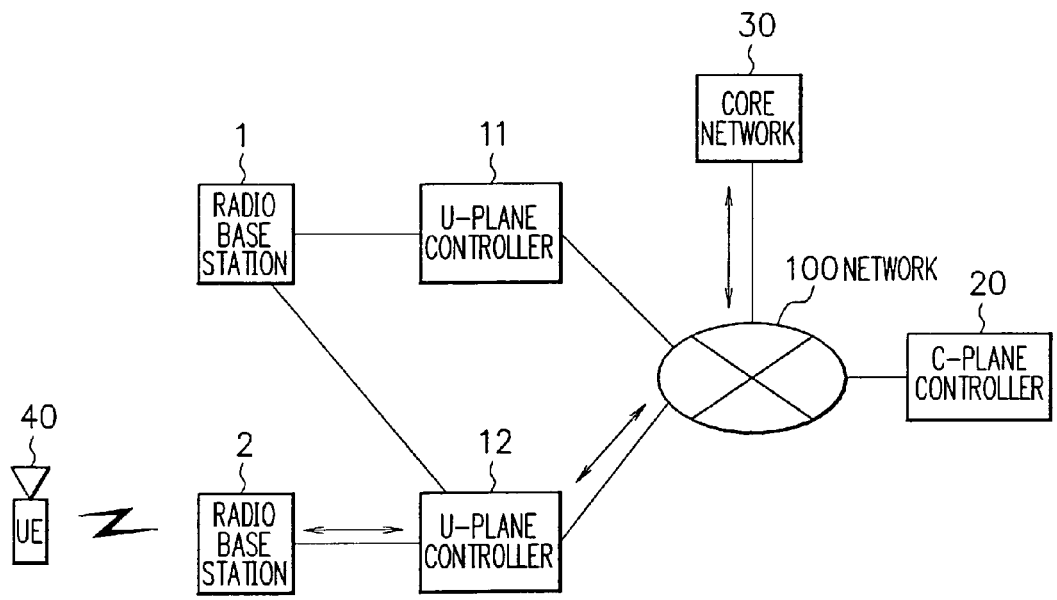
FIG. 5 is a block diagram of the data transfer system shown in FIG. 1, in which the U-plane links are further exchanged.

In FIG. 5, there is shown another embodiment of the U-plane link exchange between the radio base station 1 or 2 and the core network 30 via the U-plane controller 11 or 12, that is, from the link of the radio base station 1 and the U-plane controller 11, as shown in FIG. 1, to the link of the radio base station 2 and the U-plane controller 12 by using a message "Cell Update" as a trigger, which is sent from the UE 40 to the C-plane controller 20 as the RNC side, when the UE 40 in the CELL_PCH condition is moved from one area belonging to the radio base station 1 to another area belonging to the radio base station 2 after the UE 40 shown in FIG. 1 is changed from the CELL_DCH condition to the CELL_PCH condition.

In FIG. 5 and FIG. 7, when the UE 40 in the CELL_PCH condition is moved from the area belonging to the radio base station 1 to another area belonging to the radio base station 2, the UE 40 notifies the C-plane controller 20 that the UE 40 moved to another cell according to the conventions of the 3GPP standardization in step S701.

In the C-plane controller 20, when the cell moving information receiver 306 receives cell moving information from the UE 40, the U-plane link exchange commander 307 checks that the radio base station 2 of the moving target is assigned to which of the U-plane controllers 11 or 12 on the basis of the cell moving information received by the cell moving information receiver 306 and determines whether or not the checked U-plane controller is the U-plane controller 11 connected at the time when the UE 40 is changed from the CELL_DCH condition to the CELL_PCH condition. When the checked U-plane controller is determined to be different from the previous U-plane controller 11, the U-plane link exchange commander 307 makes a U-plane link exchange request to the core network 30 for carrying out a U-plane link exchange from the U-plane controller 11 to the U-plane controller 12 (step S702).

When receiving the U-plane link exchange request from the C-plane controller 20, the core network 30 exchanges the U-plane links by changing from the U-plane controller 11 to the U-plane controller 12 (step S703).

When up or down packet data is produced, radio link resources of each individual channel are set again via the U-plane controller 12 (step S704).

In the above-described embodiments, by newly defining the interfaces from the C-plane controller 20 to the core network 30, only the U-plane links are exchanged via the optimum U-plane controller using a position information communication function of a preexisting UE 40 without adding any change to the preexisting UE 40 and each radio base station to simplify the sending route of the U-plane data. Further, in the network structure using the C-plane/U-plane separation, a traffic control and a route control can be carried out on the basis of the condition reports of the U-plane controllers.

Hence, in the conventional system, when the UE 40 is changed from the CELL_DCH condition to the CELL_PCH condition, the U-plane link from the RNC to the core network 30 is not changed. When the UE 40 is moved to another cell belonging to a different RNC, no U-plane link exchange is made as well. Accordingly, in the conventional system, when the UE 40 in the CELL_PCH condition is moved to a different cell and then conducts a communication after returning to the CELL_DCH position, the U-plane data is once sent to the previous RNC that the UE 40 has changed in the CELL_PCH condition and is necessarily transferred to the new RNC to which the UE 40 now belongs. Therefore, a reconnection time and a problem occurrence in the route control within the network can be improved according to the present invention. Furthermore, in the conventional system, when the U-plane link exchange from the RNC regulated by the 3GPP standardization to the core network 30 via the interfaces is carried out within the specifications of the 3GPP standardization, only the U-plane link exchange is not considered and hence it is necessary to start the operation again from the C-plane setting. This problem in the conventional system can be improved according to the present invention.

While the present invention has been described with reference to the particular illustrative embodiments, it is not to be restricted by those embodiments but only by the appended claims. It is to be appreciated that those skilled in the art can change and modify the embodiments without departing from the scope and spirit of the present invention. For example, a partial function of one U-plane controller can include a function of a C-plane controller. Further, programs for allowing an information processing device to carry out all or a part of the processing operations in the above-described preferred embodiments of the present invention are also included in the present invention.

What is claimed is:

1. A data transfer system comprising:
    a user terminal to be connected to radio base stations;
    a plurality of user data plane controllers connected to the radio base stations;
    a control plane controller connected to the user data plane controllers via a network; and
    a core network connected to the user data plane controllers via the network,
    each user data plane controller including a condition reporter for monitoring at least one of network traffic conditions, resource using conditions within itself and trouble conditions at a certain time and sending monitored condition information to the control plane controller,
    the control plane controller including:
    a condition information receiver for receiving the condition information from the condition reporter of the user data plane controller;
    a user data plane link selector for selecting an optimum user plane link for providing the user terminal with services on the basis of the condition information received by the condition information receiver; and
    a user data plane link exchange commander for requesting the core network to carry out a user data plane link exchange via an optimum user data plane controller,
    the core network including a user data plane link exchanger for carrying out the user data plane link exchange.

2. A data transfer system of claim 1, wherein the condition reporter of the user data plane controller monitors at least one of the network traffic conditions, the resource using conditions within itself and the trouble conditions at a certain time and sends the monitored condition information to the control plane controller on the basis of a report request of the control plane controller.

3. A data transfer system of claim 1, wherein the user terminal includes a cell moving communicator for sending cell moving information to the control plane controller when the user terminal in a CELL_PCH condition moves to another radio base station, and the control plane controller further includes a cell moving information receiver for receiving the cell moving information sent from the cell moving communicator of the user terminal, and wherein the user data plane link exchange commander checks that the radio base station of a moving target is assigned to which of the U-plane controllers on the basis of the cell moving information received by the cell moving information receiver and requests the core network to carry out the user data plane link exchange via the optimum user data plane controller.

4. A data transfer system of claim 2, wherein the user terminal includes a cell moving communicator for sending cell moving information to the control plane controller when the user terminal in a CELL_PCH condition moves to another radio base station, and the control plane controller further includes a cell moving information receiver for receiving the cell moving information sent from the cell moving communicator of the user terminal, and wherein the user data plane link exchange commander checks that the radio base station of a moving target is assigned to which of the U-plane controllers on the basis of the cell moving information received by the cell moving information receiver and requests the core network to carry out the user data plane link exchange via the optimum user data plane controller.

5. A data transfer method including a user terminal to be connected to radio base stations, a plurality of user data plane controllers connected to the radio base stations, a control plane controller connected to the user data plane controllers via a network, and a core network connected to the user data plane controllers via the network, comprising:
    step 1 for monitoring at least one of network traffic conditions, resource using conditions within itself and trouble conditions at a certain time and sending monitored condition information to the control plane controller by means of a condition reporter of each user data plane controller;
    step 2 for receiving the condition information from the condition reporter of the user data plane controller by means of a condition information receiver of the control plane controller;
    step 3 for selecting an optimum user plane link for providing the user terminal with services on the basis of the condition information received by the condition information receiver by means of a user data plane link selector of the control plane controller;
    step 4 for requesting the core network to carry out a user data plane link exchange via an optimum user data plane controller by means of a user data plane link exchange commander of the control plane controller; and
    step 5 for carrying out the user data plane link exchange by means of a user data plane link exchanger of the core network.

6. A data transfer method of claim 5, wherein in step 1, the condition reporter of the user data plane controller monitors at least one of the network traffic conditions, the resource using conditions within itself and the trouble conditions at a certain time and sends the monitored condition information to the control plane controller on the basis of a report request of the control plane controller.

7. A data transfer method of claim 5, further comprising:

step 6 for sending cell moving information to the control plane controller when the user terminal in a CELL_PCH condition moves to another radio base station by means of a cell moving communicator of the user terminal; and step 7 for receiving the cell moving information sent from the cell moving communicator of the user terminal by means of a cell moving information receiver of the control plane controller, wherein in step 4, the user data plane link exchange commander checks that the radio base station of a moving target is assigned to which of the U-plane controllers on the basis of the cell moving information received by the cell moving information receiver and requests the core network to carry out the user data plane link exchange via the optimum user data plane controller.

8. A data transfer method of claim 6, further comprising:

step 6 for sending cell moving information to the control plane controller when the user terminal in a CELL_PCH condition moves to another radio base station by means of a cell moving communicator of the user terminal; and step 7 for receiving the cell moving information sent from the cell moving communicator of the user terminal by means of a cell moving information receiver of the control plane controller, wherein in step 4, the user data plane link exchange commander checks that the radio base station of a moving target is assigned to which of the U-plane controllers on the basis of the cell moving information received by the cell moving information receiver and requests the core network to carry out the user data plane link exchange via the optimum user data plane controller.

* * * * *